July 17, 1951 — W. RODDER — 2,561,292
CARRIAGE FOR FLYING HOT SAWS
Filed Nov. 28, 1949 — 2 Sheets-Sheet 1

INVENTOR.
WILLIAM RODDER
BY Bosworth & Sessions
ATTORNEYS

July 17, 1951 W. RODDER 2,561,292
CARRIAGE FOR FLYING HOT SAWS
Filed Nov. 28, 1949 2 Sheets-Sheet 2

INVENTOR.
WILLIAM RODDER
BY Bosworth & Sessions
ATTORNEYS

Patented July 17, 1951

2,561,292

UNITED STATES PATENT OFFICE 2,561,292

CARRIAGE FOR FLYING HOT SAWS

William Rodder, Youngstown, Ohio, assignor to The Aetna-Standard Engineering Company, Youngstown, Ohio, a corporation of Ohio Application November 28, 1949, Serial No. 129,716

12 Claims. (Cl. 29—69)

This invention relates to a carriage for mounting a motor-driven saw traveling in an orbital path and forming part of a flying hot saw of the kind claimed in co-pending application Serial No. 69,521, filed January 6, 1949, for "Flying Hot Saw," of which the present application is in part a continuation.

In a flying hot saw of the kind shown, described and claimed in such prior application, a notched cam serves to deflect the work into the path of a circular saw mounted for orbital movement. Such saw, together with a motor by which it is driven, is mounted on a frame carried by two cranks rotated by power trains from a separate drive motor at the rear of the apparatus as a whole. The saw assembly, by which is meant the saw, the motor to which it is coupled, and the frame on which they are mounted, is rotated in an orbital path (usually in a counterclockwise direction as seen from the front of the apparatus) in such manner that the saw periodically enters into the notch in the cam to perform the function of severing the leading end of the work into a separate section of the desired length.

For the reason that they are subject to a variety of stresses, including the stresses characteristic of a centrifugal system, the saw assembly and many of the parts that go to make it up must be strong, sturdy and rigid to a high degree. As a result, these parts are likely to be of massive construction, which is undesirable for the reason that their size and weight contribute to the load imposed on the apparatus as a whole and to the stresses under which the saw assembly must operate. The present invention has for its objects, inter alia, to provide a strong, sturdy, rigid carriage embodying these and associated parts that mutually reinforce each other, permitting the size and weight of the parts to be held to a minimum and reducing the load and stresses under which the saw assembly and the apparatus as a whole must operate.

Figures 1, 2, 3:
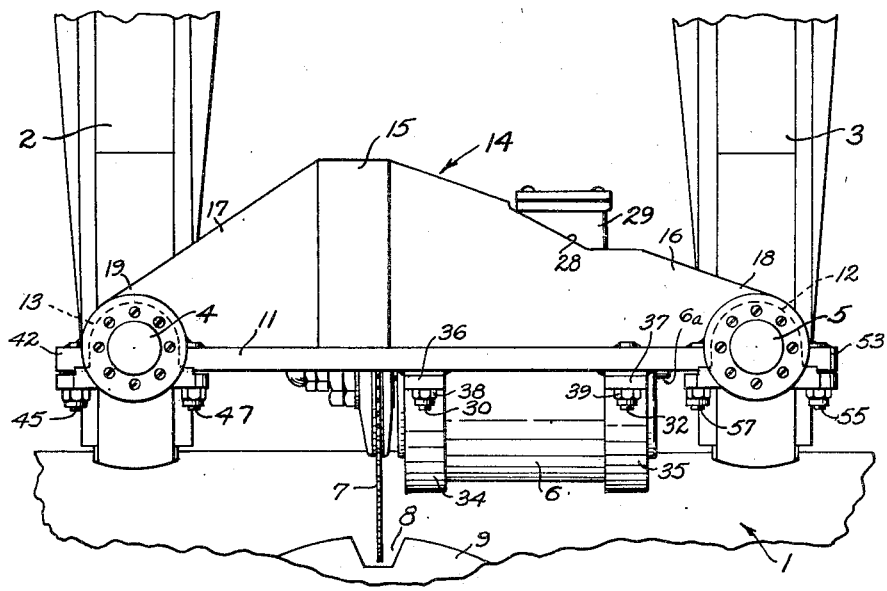
Figure 4:
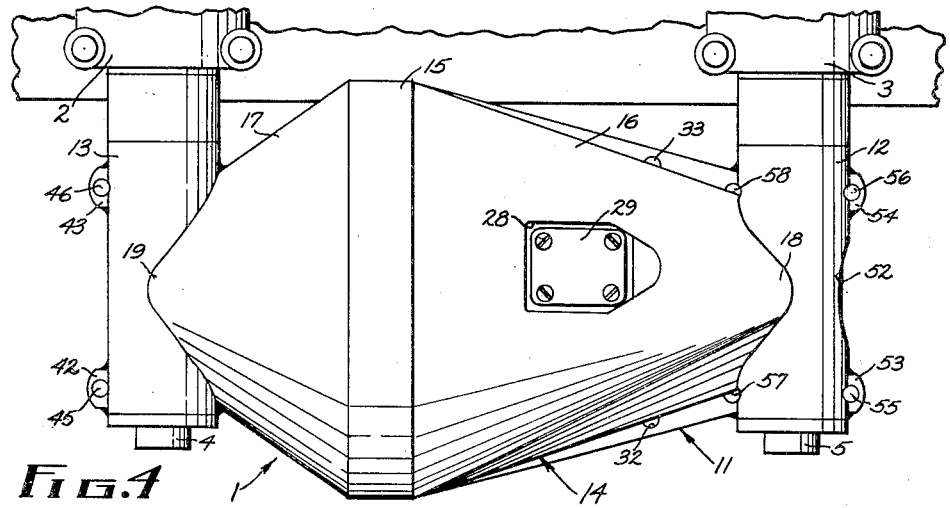
Figure 5:
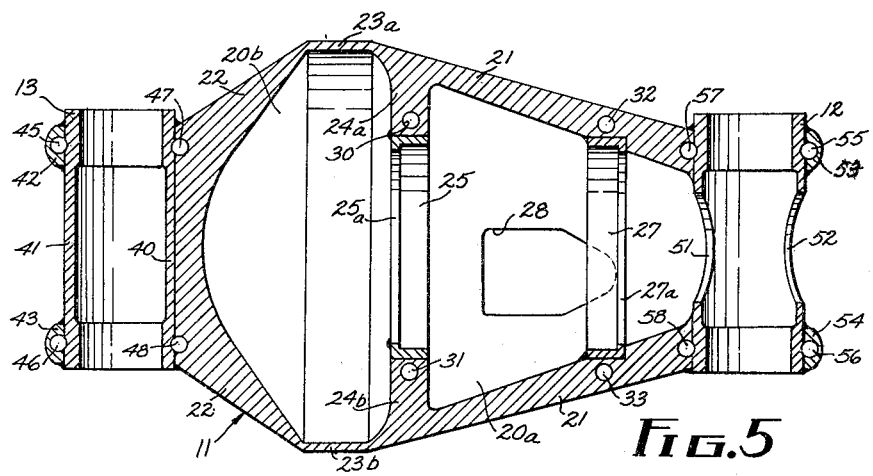
Figure 6:
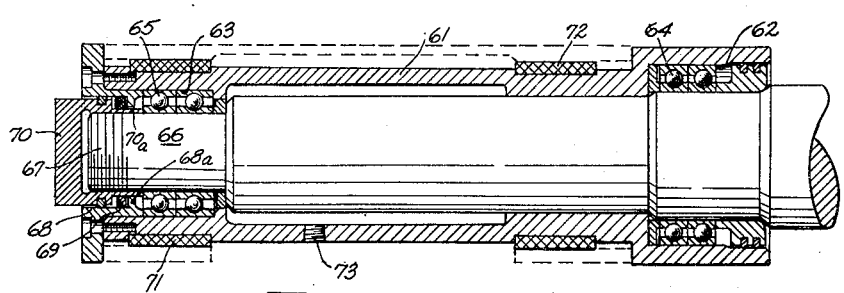

Other objects and advantages of the invention will be apparent from the description which follows and from the accompanying drawings, in which Figure 1 is a fragmentary elevation of the front end of a flying hot saw showing the carriage in which the saw assembly is embodied; Figure 2 is a vertical section, with parts in elevation, of the carriage shown in Figure 1; Figure 3 is a like vertical section, omitting, however, the motor, the saw coupled thereto, and the carriage and motor clamps; Figure 4 is a plan of the carriage shown in elevation in Figure 1; Figure 5 is a horizontal section on line 5—5 of Figure 3; and Figure 6 is a longitudinal section, with the crank pin in elevation, through one of the bearing cartridges.

As shown in Figures 1 and 4 of the drawings, carriage 1 is mounted by and between two crank arms 2 and 3, of which crank pins 4 and 5 form part. A motor 6 is held therein in such manner that motor shaft 6a extends longitudinally of the carriage somewhat below the level of the axes of crank pins 4 and 5, as illustrated in Figures 1 and 2. Coupled to motor 6, preferably by mounting it on motor shaft 6a, is a circular saw 7 which cooperates as already stated with notch 8 in cam 9. Motor 6 and saw 7 are usually of such dimensions as to project upward above and downward below crank pins 4 and 5.

Extending from one to the other of crank pins 4 and 5 is a metal frame 11 to which is welded, at the forward end thereof, a transversely extending metal sleeve-like member 12 and, at the other end thereof, a generally similar sleeve-like member 13. These members are referred to as "sleeve-like" for the reason that in large measure they perform the function of sleeves; however, they are half-sleeves, semi-cylindrical in shape, include two opposed depending skirts hereinafter described, and, below such skirts, are open on their lower sides as indicated in Figure 3. Welded to sleeve-like members 12 and 13 is a welded metal casing 14 of built-up construction, the same comprising a short but wide semicylindrical intermediate section 15, a semiconical forward section 16, and an oppositely extending semi-conical rear section 17. At its narrow end, forward section 16 is faired into sleeve-like member 12 in the manner indicated at 18; similarly, at its narrow end rear section 17 is faired into sleeve-like member 13 as indicated at 19.

Casing 14 thus forms a unitary structure with sleeve-like members 12 and 13 and frame 11, which, as appears from Figure 5, is shaped much like casing 14 as seen from above in Figure 4.

Frame 11 is characterized by a forward portion 21 taking the form of an isosceles trapezoid, a rear portion 22 likewise taking the form of an isosceles trapezoid, and, between them, longitudinal spacers 23a and 23b. The spacers correspond in length to semi-cylindrical intermediate section 15 of casing 14 and, as is also true of such section, are not located precisely midway between sleeve-like members 12 and 13 but nearer rear sleeve-like member 13 than forward sleeve-like member 12, thus putting the widest portion of casing 14 in juxtaposition to saw 7;

i. e., somewhat to the rear of the geometric center. By virtue of the fact that forward portion 21 and overlying section 16 on one hand and rear portion 22 and overlying section 17 on the other are of considerably greater length than spacers 23a, 23b and overlying section 15, frame 11 presents a more or less hexagonal appearance; however, because of the presence of spacers 23a, 23b, frame 11 is in fact octagonal in shape. Frame 11 is so formed, as by casting or flame-cutting, as to provide a large forward opening 20a for motor 6 and a somewhat smaller rear opening 20b for saw 7.

As shown in Figure 5, frame 11 is characterized by the presence between forward opening 20a and rear opening 20b of two oppositely extending groins 24a and 24b partially bridging the frame just forward of spacers 23a and 23b. Welded at its ends to groins 24a and 24b is a semi-circular strap 25 which is rearwardly flanged as at 25a and which itself accommodates one of the two flanges, 6b and 6c, of motor 6. Surrounding strap 25 and welded in place to strap 25 and to forward section 16 of casing 14 is a semi-annular web 26 best shown in Figures 2 and 3. A second semi-circular strap 27, similar to strap 25 but forwardly flanged as at 27a, is welded to frame 11 well forward of strap 25, the purpose of strap 27 being to accommodate the other of the two flanges of motor 6. In forward section 16 of casing 14 is provided an opening 28 through which projects conduit box 29 of motor 6.

Welded in place in frame 11 and projecting downward as indicated in Figure 3 are four studs 30, 31, 32 and 33, of which studs 30 and 31 are located as shown in Figure 5 in groins 24a and 24b, respectively, and studs 32 and 33 are located in the side portions of frame 11 immediately adjoining the ends of semi-circular strap 27. Studs 30 and 31 accept and hold in place the ends of a depending semi-circular motor clamp 34 having at opposite ends thereof two ears provided with openings to receive studs 30 and 31, one of such ears, 36, appearing in Figure 1. A similar depending motor clamp 35, likewise semi-circular in shape, cooperates with studs 32 and 33, the ends of such clamp being characterized by ears with openings therein of which one, 37, appears in Figure 1. Clamps 34 and 35 are respectively rearwardly flanged at 34a and forwardly flanged at 35a as shown in Figure 2.

With motor 6 and saw 7 held manually in position, the ends of the motor clamps are brought into juxtaposition to groins 24a and 24b and to the side members of frame 11 where these parts adjoin the ends of straps 25 and 27. Thereupon the clamps are fixed by nuts to the studs and, after being so fixed in place, are permitted to carry the weight of the motor 6. As indicated in Figure 1, a nut 38 cooperates with stud 30 and a similar nut 39 cooperates with stud 32 on the opposite side of motor 6. In this manner, the motor can be suspended with motor shaft 6a at the desired level at or just below the level of the axes of crank pins 4 and 5, depending on the precise position relative to the top or bottom of frame 11 of the ends of straps 25 and 27 and clamps 34 and 35.

As previously mentioned, each of sleeve-like members 12 and 13 is characterized by two depending skirts. The latter extend downward for a short distance below the level of the axes of the crank pins. In the case of sleeve-like member 13, shown at the left in Figures 2 and 3, the skirt depending therefrom at the inner edge of the sleeve-like member is designated 40, while the corresponding skirt at the outer edge of sleeve-like member 13 is designated 41. As indicated in Figure 5, skirt 41 has welded thereto two ears 42 and 43 to which are welded studs 45 and 46, the same projecting downward in the same manner as studs 30 to 34, inclusive. Two like studs 47 and 48 are welded to frame 11 at the narrow end of trapezoidal rear portion 22. Extending between studs 45 and 47 near the end of crank pin 4 is a depending semi-circular carriage clamp (not shown). A similar depending carriage clamp 50 extends between studs 46 and 48 near the base of crank pin 4.

Sleeve-like member 12 at the forward end of casing 14 is similar to sleeve-like member 13 except that cutaway portions 51 and 52, more or less semi-circular in shape, give it the appearance indicated in Figure 5. Cutaway portions 51 and 52 are provided to permit a boring tool to be manipulated inside casing 14 in the process of machining it. Sleeve-like member 12 is provided with ears 53 and 54, welded thereto, to which are welded studs 55 and 56. At the narrow end of forward trapezoidal portion 21 are two like studs 57 and 58. All four studs project downward as indicated in Figures 2 and 3. Studs 55 and 57 cooperate with a semi-circular carriage clamp (not shown) located at the end of crank pin 5 while studs 56 and 58 cooperate with a like semi-circular carriage clamp 60, shown in Figure 2, located at the base of crank pin 5.

In each case, the crank pin is surrounded by a bearing cartridge of the kind shown in section in Figure 6. As therein indicated, bearing cartridge 61 includes a large bearing housing 62 located near the base of the crank pin and a similar but smaller bearing housing 63 at the end of the crank pin. Bearing housings 62 and 63 accommodate bearings 64 and 65, respectively, of which the former has and the latter may have a small amount of endwise clearance and a sliding fit in the bearing housings to permit sufficient sliding movement of the bearings with respect to the housings to accommodate slight misalignment of the crank pins 4 and 5 and expansion of the parts due to heat. Bearing 65 surrounds a reduced portion 66 formed integrally with the crank pin which portion is threaded as at 67. Held in place by screws (not shown in Figure 6 but indicated in Figure 1) is a flanged retaining sleeve 68 having near the base thereof an inwardly extending annular shoulder 68a. A lubrication seal 69 of annular configuration adjoins shoulder 68a, making contact with the interior surface of retainer 68. An end plug 70 with an integral sleeve-like extension 70a is screwed to and is the only externally visible part of the crank pin.

As shown in Figure 6, bearing cartridge 61 is surrounded by two mounting rings 71 and 72 of some suitable resilient material such as rubber, synthetic rubber, synthetic resin or the like; e. g., the synthetic rubber known under the trademark "Neoprene." Sleeve-like members 12 and 13 rest on mounting rings 71 and 72 as indicated in dotted lines in Figure 6. The carriage clamps cooperating therewith likewise are shown in dotted lines. A tapped opening 73 in bearing cartridge 61 accommodates a lubrication fitting, thus permitting the interior of bearing cartridge 61 to be lubricated whenever desirable or necessary.

From the foregoing, it will be apparent that the invention provides a carriage the parts of which reinforce each other to permit the use of materials of the minimum practicable size and weight. Thus sleeve-like members 12 and 13 are coupled to each other not only through frame 11 but also through casing 14, while the latter is united to frame 11 not only by suitable welds extending continuously along the edges thereof but also by transversely extending web 26 and strap 25. Other features of the invention such as the fact that groins 24a and 24b and web 26 serve to divide casing 14 into two parts, one of them serving as a housing for the motor and the other as a guard for the saw, will be apparent, as will the fact that numerous changes in size, proportions, and relation of parts may be made without departing from the spirit of the invention.

It is intended that the patent shall cover, by summarization in the appended claims, whatever features of patentable novelty reside in the invention.

I claim:

1. In a flying hot saw, a carriage for transmitting orbital movement to the saw comprising a frame; a first sleeve-like member rigidly attached to the frame at one end thereof; a second sleeve-like member rigidly attached to the frame at the other end thereof; a strap depending from the frame; a motor carried by the strap, said motor having coupled thereto a circular saw extending transversely of the frame; and, overlying the frame and serving as a guard for the saw and as a housing for the motor, a casing extending from one to the other of said sleeve-like members.

2. A carriage as in claim 1 in which the casing is narrowest where it adjoins the sleeve-like members and widest where it overlies the saw.

3. A carriage as in claim 1 in which the casing is oppositely tapered from the part thereof overlying the saw to the sleeve-like members at the ends thereof.

4. In a flying hot saw, a carriage for transmitting orbital movement to the saw comprising a frame; a first sleeve-like member rigidly attached to the frame at one end thereof; a second sleeve-like member rigidly attached to the frame at the other end thereof; a casing extending from one to the other of said sleeve-like members; means dividing the casing into a saw compartment and a motor compartment; and, for suspending a motor-driven saw within the casing, a motor support associated with the motor compartment.

5. A carriage as in claim 4 in which the motor projects downward below the frame.

6. A carriage as in claim 4 in which the motor is suspended with the motor shaft substantially in the plane of the frame.

7. A carriage as in claim 4 in which the motor shaft projects into the saw compartment to serve as a support for the saw.

8. A carriage as in claim 4 in which the motor support takes the form of one or more semi-circular straps depending from the casing below the motor compartment.

9. In a flying hot saw, a carriage for transmitting orbital movement to the saw comprising two spaced half-sleeves interconnected by a frame each of which receives a crank pin and each of which has connected thereto one or more straps restraining the crank pin against lateral displacement relative to the half-sleeve in which it is received.

10. A carriage as in claim 9 in which a bearing cartridge surrounds the crank pin.

11. A carriage as in claim 10 in which the bearing cartridge is encircled by one or more yieldable members with which the half-sleeve makes contact.

12. In a flying hot saw, a carriage for transmitting orbital movement to the saw comprising a frame; a first sleeve-like member rigidly attached to the frame at one end thereof; a second sleeve-like member rigidly attached to the frame at the other end thereof; a bearing cartridge received within each of said sleeve-like members, each of said bearings cartridges accommodating a crank pin; a casing extending from one to the other of said sleeve-like members; means dividing the casing into a saw compartment and a motor compartment; and, for suspending a motor-driven saw within the casing, a motor support associated with the motor compartment.

WILLIAM RODDER.

No references cited.